Jan. 3, 1961 W. H. JOHNSON 2,966,977
OVERLOAD LIMITING CLUTCH
Filed Oct. 17, 1957
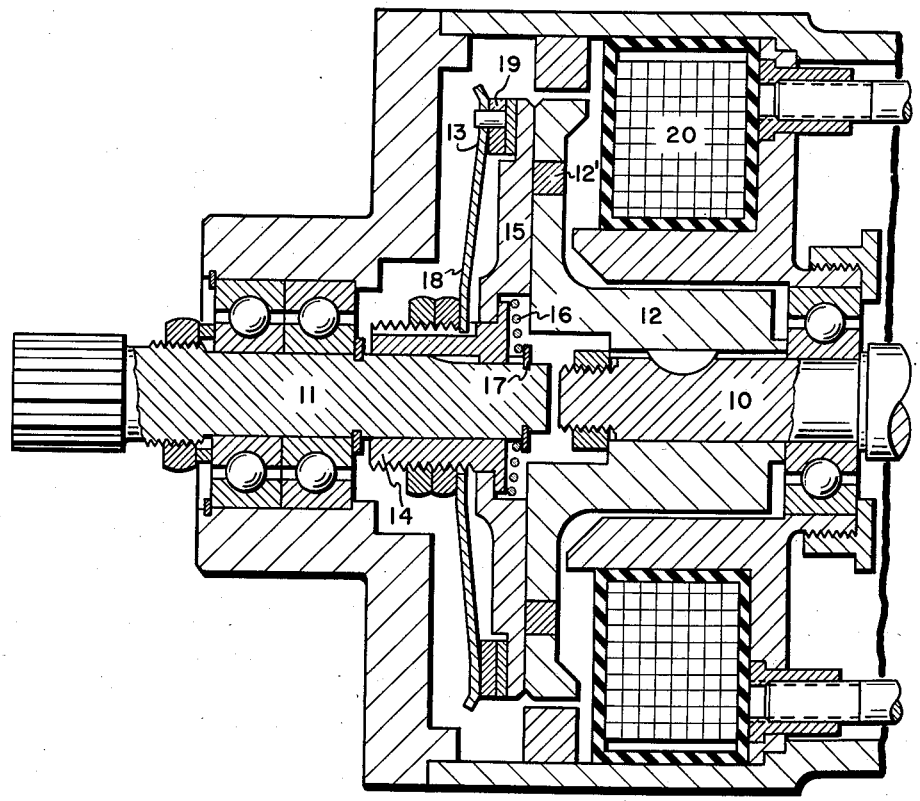
INVENTOR.
Weldon H. Johnson
BY
Clyde H. Haynes
ATTORNEY

United States Patent Office

2,966,977
Patented Jan. 3, 1961

2,966,977

OVERLOAD LIMITING CLUTCH

Weldon H. Johnson, Rockford, Mich., assignor to Lear, Incorporated

Filed Oct. 17, 1957, Ser. No. 690,678

1 Claim. (Cl. 192—84)

This invention relates to motion transfer devices and, more in particular, to motion transfer devices capable of transferring power below a set load limit when the parts of the device are cooperatively operating to transfer motion from one part to another part thereof.

In the past, various types of motion transmitting devices and/or power transmission devices, or the like, have been constructed in the form of clutches. In these prior devices, two or more motion transfer devices were connected in series operation with one of the devices capable of transferring motion and power below a set load limit and the other device capable of transferring motion and power above that set load limit. An example of such structure is illustrated in Patent No. 1,981,167 issued November 20, 1934 to E. R. Frost and which describes a friction clutch in series with an overload slip clutch.

Electromagnetic clutches wherein magnetic flux lines are threaded through clutch plates to effect transmission or transfer of motion from one clutch plate to another plate also have been devised. Patent No. 2,267,114 issued December 23, 1941 to W. P. Lear, et al., and assigned to the assignee of the present invention, illustrates one of these electromagnetic clutches.

Although the prior motion transfer devices did the job for which they were intended, it was found that they had certain drawbacks and presented problems, the overcoming of which are among the objects of the present invention.

One of the objects of the present invention is to provide a motion transfer device which has both friction clutch characteristics and electromagnetic clutch characteristics.

Another object of the present invention is to provide a motion transfer device which is simple in construction, economical and easy to manufacture, positive in operation and compact in design.

A further object of the present invention is to provide a motion transfer device capable of transferring power below a set load limit when the parts of the device are cooperatively operating and which will not transfer power caused by shock loads or overloading above that set load limit.

In this device, one of the three members constitutes a motion transmitting member and another constitutes a motion receiving member. Generally, the three members take the form of a driven member, a driving member and a floating member positioned between the driving and the driven members. The driven member is maintained in frictional contact with the floating member with the frictional engagement controlled by suitable resilient means so that power below a pre-determined set load limit will be transmitted between the floating member and the driven member and so the slippage will occur between the floating and driven members if power above that load limit is attempted to be transferred therebetween. The floating member and the driving member are resiliently urged apart and means for threading magnetic flux lines through these members is provided to effect driving of the floating member and thus the driven member by the driving member with the magnetic flux lines being strong enough to transfer power greater than the set load limit.

In this construction it is thus apparent that a magnetic clutch is provided which is capable of transmitting power above a set load limit and that a friction clutch is provided to prevent actual transfer of power above the set load limit thereby safely preventing overload or transmission of shock loads which could damage the equipment.

Referring to the drawing, there is illustrated a specific example of a motion transfer device incorporating the features of the invention. This example includes a driving shaft 10 and a driven shaft 11 co-axially aligned in spaced end to end relationship. Driving clutch plate 12 is keyed or otherwise secured to driving shaft 10 for rotation thereby and a driven clutch plate 13 mounted on a hub 14 on shaft 11 imparts rotational movement through the hub 14 to the shaft 11 when it is rotated by a driving clutch plate 12. The hub 14 is keyed or otherwise secured to the shaft 11 in such manner that it is axially movable relative to the shaft. Also floated on hub 14 for movement both axially and angularly relative thereto is floating clutch plate 15 which extends between and separates driving clutch plate 12 and driven clutch plate 13. The hub 14 is urged away from clutch plate 12 by resilient means, such for example, coil spring 16 compressed between the end of the hub and a portion 17 of shaft 11 to separate plates 12 and 15. Simultaneously, clutch plate 13 is resiliently urged and maintained in friction contact with clutch plate 15 by suitable resilient means. In this instance it has been found advisable to construct driven clutch plate 13 from a leaf spring 18 and an annular friction member 19 carried thereby. The leaf spring 18, the term "leaf" also including dish shaped springs, is mounted on the hub 14 with the friction member 19 mounted at the periphery thereof for frictional engagement with an annular peripheral portion of floating clutch plate 15.

The device further includes magnetic flux line producing apparatus, such for example, coil 20, encircling shaft 10 and polarized to thread magnetic flux lines radially through clutch plate 12 to attract floating clutch plate 15 towards clutch plate 12 to effect driving connection between driving plate 12 and floating plate 15. In actual practice, it has been found advisable to provide clutch plate 12 with an annular portion 12' of material incapable of conducting magnetic flux lines or with means for restricting the conducting of flux lines to force these flux lines to thread their way through at least a portion of floating clutch plate 15 in the manner well known in the art.

The motion transfer device operates as follows: In normal non-motion transmitting position, coil spring 16 urges floating plate 15 away from driving plate 12 and spring 18 maintains friction contact between floating plate 15 and driven plate 13. Upon energization of electromagnet 20, magnetic flux lines are threaded through plate 12 and floating plate 15 to effect a driving connection therebetween, the flux lines being sufficiently strong to overcome spring 16, and spring 18 continuously maintaining plate 13 in friction contact with plate 15.

It is thus apparent that a motion transfer device capable of transmitting power and incorporated within the concepts and objects of the present invention has been attained in the specific example herein described and illustrated.

Although the present invention has been described with a certain degree of particularity, it is understood that various modifications in the details and arrangements of parts may be had without departing from the spirit and scope of the invention as hereinafter claimed.

I claim:

In combination, a driving shaft and a driven shaft coaxially aligned, a first plate secured to said driving shaft and a second plate secured to said driven shaft, a third plate positioned between said first and second plates and mounted on said driven shaft for rotational and axial freedom relative to said driven shaft and said first and second plates, first resilient means to maintain said second plate in frictional contact with said third plate, second resilient means for urging said third plate away from frictional contact with said first plate, means for producing magnetic attraction between said first and third plates, such that said second resilient means is overcome and said first and third plates come into frictional contact, and non magnetic means disposed in said first plate for directing the flux path through said first and third plates several times.

References Cited in the file of this patent

UNITED STATES PATENTS

| | | |
|---|---|---|
| 732,943 | Jenatzy | July 7, 1903 |
| 1,327,506 | Walker | Jan. 6, 1920 |
| 1,453,202 | Stevens | Apr. 24, 1923 |
| 1,981,167 | Frost | Nov. 20, 1934 |
| 2,315,298 | Thompson | Mar. 30, 1943 |
| 2,321,525 | Schroeder | June 8, 1943 |
| 2,401,003 | Lear | May 28, 1946 |
| 2,675,835 | Kiekhaefer | Apr. 20, 1954 |

FOREIGN PATENTS

| | | |
|---|---|---|
| 655,126 | Great Britain | July 11, 1951 |